United States Patent
Suzuki

(10) Patent No.: US 8,836,869 B2
(45) Date of Patent: Sep. 16, 2014

(54) PROJECTION DISPLAY APPARATUS

(75) Inventor: Yasuo Suzuki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 179 days.

(21) Appl. No.: 13/210,118

(22) Filed: Aug. 15, 2011

(65) Prior Publication Data

US 2011/0298828 A1    Dec. 8, 2011

Related U.S. Application Data

(63) Continuation of application No. 11/671,114, filed on Feb. 5, 2007.

(30) Foreign Application Priority Data

Feb. 8, 2006 (JP) .................................. 2006-031047

(51) Int. Cl.
*H04N 9/31* (2006.01)

(52) U.S. Cl.
CPC ............ *H04N 9/3197* (2013.01); *H04N 9/3194* (2013.01); *H04N 9/3185* (2013.01); *H04N 9/3102* (2013.01)
USPC ................................. 348/744; 345/7; 348/745

(58) Field of Classification Search
CPC ......... H04N 9/31; H04N 9/3102; G03B 1/00; G03B 1/14; G03B 27/68
USPC ................... 345/7; 353/69–70; 348/744–745; 352/69–70
See application file for complete search history.

(56) References Cited

U.S. PATENT DOCUMENTS

| | | | | |
|---|---|---|---|---|
| 5,795,046 A * | 8/1998 | Woo | | 353/69 |
| 6,520,647 B2 * | 2/2003 | Raskar | | 353/70 |
| 6,686,973 B2 * | 2/2004 | Su | | 348/745 |
| 6,843,569 B2 * | 1/2005 | Hirao et al. | | 353/70 |
| 6,877,863 B2 * | 4/2005 | Wood et al. | | 353/70 |
| 6,974,217 B2 * | 12/2005 | Kimura et al. | | 353/69 |
| 7,131,732 B2 * | 11/2006 | Inoue | | 353/70 |
| 7,303,285 B2 * | 12/2007 | Inoue | | 353/70 |
| 7,658,498 B2 * | 2/2010 | Anson | | 353/69 |
| 2003/0095239 A1 * | 5/2003 | Hirao et al. | | 353/69 |
| 2004/0036844 A1 * | 2/2004 | Wood et al. | | 353/70 |
| 2004/0041985 A1 * | 3/2004 | Kimura et al. | | 353/70 |
| 2005/0012907 A1 * | 1/2005 | Inoue | | 353/70 |
| 2005/0030487 A1 * | 2/2005 | Inoue | | 353/69 |
| 2005/0078282 A1 * | 4/2005 | Tamura | | 353/70 |
| 2007/0071431 A1 * | 3/2007 | Inoue et al. | | 396/116 |

FOREIGN PATENT DOCUMENTS

CN    1445987 A    10/2003
JP    2003005278 A  *  1/2003

OTHER PUBLICATIONS

Machine Translation of JP-2003005278.*

* cited by examiner

*Primary Examiner* — Jason Mandeville
(74) *Attorney, Agent, or Firm* — Canon U.S.A., Inc. IP Division

(57) ABSTRACT

A projection display apparatus includes a display unit adapted to generate an image, a projection unit adapted to project the image generated by the display unit, a control unit adapted to control the image generated by the display unit, a detection unit adapted to issue an output changed depending on an inclination angle of the projection display apparatus, and a storage unit adapted to store a plurality of horizontal reference values corresponding to installed states of the projection display apparatus. The control unit in the projection display apparatus changes the image generated by the display unit in accordance with an output of the detection unit and the selected horizontal reference value.

5 Claims, 10 Drawing Sheets

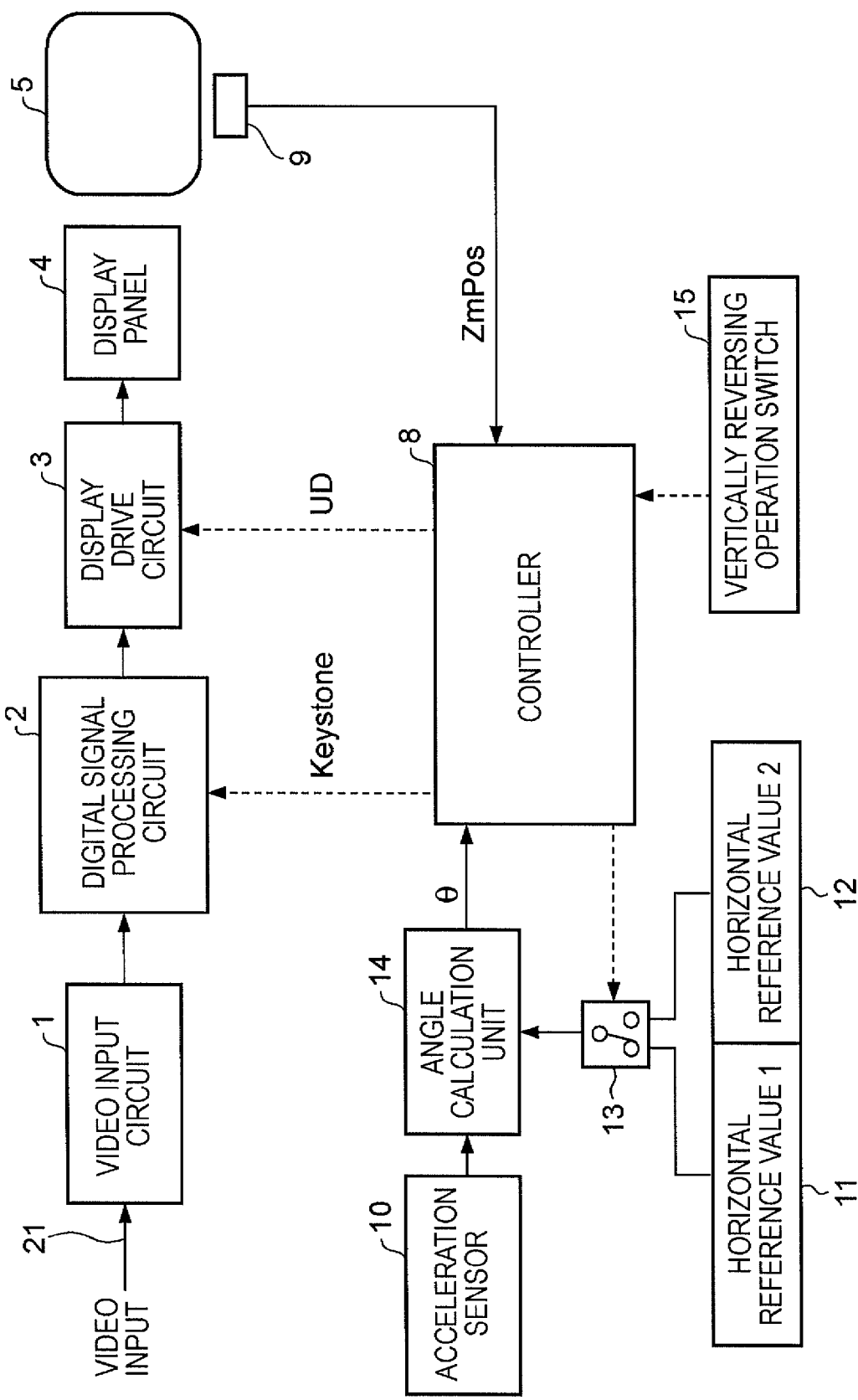

VERTICALLY NOT-REVERSED INSTALLATION (FLOOR-STANDING)

$\theta L_0$: INCLINATION OF LIGHT AXIS OF PROJECTION LENS FROM HORIZONTAL $\theta G_0$: INCLINATION OF DETECTION AXIS OF ACCELERATION SENSOR FROM HORIZONTAL

VERTICALLY REVERSED INSTALLATION (HANGING)

OUTPUT OF ACCELERATION SENSOR

PROJECTION DISPLAY APPARATUS

The present application is a continuation of U.S. patent application Ser. No. 11/671,114, filed Feb. 5, 2007, entitled "PROJECTION DISPLAY APPARATUS", the content of which is expressly incorporated by reference herein in its entirety. Further, the present application claims priority from Japanese Patent Application No. 2006-031047 filed Feb. 8, 2006, which is also hereby incorporated by reference herein in its entirety.

BACKGROUND OF THE INVENTION

1. Field of the Invention

The present invention relates to a projection display apparatus.

2. Description of the Related Art

When an image is projected by a projector (projection display apparatus) onto a screen in an oblique direction, the projected image is deformed into a trapezoidal shape. This phenomenon is called a trapezoid distortion or Keystone distortion. In order to correct the trapezoid distortion, a projector with the so-called digital Keystone correction function of changing the form of the projected image through digital image signal processing has already been commercialized. In a product having that function, a Keystone correction input amount is usually decided in a manual manner.

Also, an image projection apparatus is proposed which includes an inclination sensor in a projector body and automatically corrects the trapezoid distortion depending on the detected inclination angle (see Patent Document 1: Japanese Patent Laid-Open No. 2001-186538). For example, an acceleration sensor is employed as the inclination sensor.

FIGS. 7A and 7B show the principle for calculating the inclination angle by the acceleration sensor. The detection axis of the acceleration sensor is assumed to be parallel to an optical axis.

In FIG. 7A, reference numeral 10 denotes an acceleration sensor, and 100 denotes a projector. The projector 100 is horizontally installed in FIG. 7A. Therefore, a gravity component does not occur in the direction of the detection axis, and the output of the acceleration sensor 10 shows 0 [g] (g represents the acceleration of gravity).

On the other hand, in FIG. 7B, the projector is installed in a state inclined by $\theta$ [degree] relative to the horizontal. In this case, the acceleration sensor output shows $\sin \theta$ [g]. Accordingly, the inclination angle can be detected by calculating arcsine ($\sin^{-1}$) of the acceleration sensor output.

FIG. 8 illustrates one example of the acceleration sensor output. The acceleration sensor output is detected in the form of an analog voltage output or a DUTY output. The number of detection axes ranges from one to three. Herein, a 1-axis analog voltage output is described as an example because it is relatively inexpensive to practice.

The acceleration sensor outputs a voltage in proportion to the detected acceleration (i.e., Vout_m1g [V] at −90 degrees, Vout_0g [V] at the horizontal, and Vout_p1g [V] at +90 degrees).

(Vout_0g-Vout_m1g) or (Vout_p1g-Vout_0g) is called "sensitivity" and represents an output voltage per 1 [g]. Also, Vout_0g is called "Og offset" and represents the output of the acceleration sensor at 0 [g] (=horizontal).

The acceleration sensor is constituted by a semiconductor in many cases, and "sensitivity" and "Og offset" have variations depending on individual parts.

Further, variations may occur in accuracy in mounting inclination of the acceleration sensor, accuracy in substrate mounting, etc. Therefore, acceleration sensors are desired to be adjusted individually.

In particular, a variation in the Og offset greatly affects the automatic trapezoid correction function that is often used near 0 degree of the inclination angle. Thus, projectors have to be individually adjusted in order to realize angle detection with high accuracy by using acceleration sensors.

Adjustment of individual acceleration sensors are generally performed by a method of experimentally measuring the relationship between the acceleration sensor output and angle with respect to a plurality of angles (see Patent Document 2: Japanese Patent Laid-Open No. 2004-334116), or a method of correcting values of "sensitivity" and "Og offset" of the acceleration sensor.

A flowchart of FIG. 9A shows the latter adjustment method. It is assumed that the detection axis of the acceleration sensor is arranged substantially parallel to the optical axis of a projection lens.

First, the adjustment is started in S101. In S102, the projector is installed in a vertically not-reversed state with the optical axis set in a horizontal state.

In S103, the acceleration sensor output (Vout_0) in the above state is stored in a storage unit. Namely:

Og offset=Vout_0

In S104, the optical axis of the projector is set to an allowable maximum installation angle $\theta m$ relative to the horizontal.

In S105, the acceleration sensor output (Vout_m) in the maximally inclined state is stored. Further, the sensitivity is calculated based on the following formula:

sensitivity=(Vout_m−Vout_0)/sin $\theta m$

In S106, the obtained Og offset and sensitivity are stored in a memory within the projector. In S107, the adjustment is brought to an end.

The relationship between the output of the acceleration sensor and the acceleration of gravity is linear. Accordingly, if the output of the acceleration sensor is Vout at an arbitrary inclination angle $\theta$, the inclination angle $\theta$ is calculated by:

$$\theta = \sin^{-1}([\text{detected voltage at horizontal reference}]/[\text{sensitivity}])$$
$$= \sin^{-1}(\sin \theta m \times (Vout - \text{Vout\_0})/(\text{Vout\_m} - \text{Vout\_0}))$$

The automatic trapezoid (distortion) correction can be accurately performed on the projected image by using the calculated angle.

In practice, however, when the projector is used in the vertically reversed state, it is sometimes used in a state hanging from the ceiling. When the projector is used in such a way, the trapezoid correction cannot be accurately performed in some cases just by using the above-described adjustment method. The reason will be described below with reference to FIGS. 10A-10D.

FIG. 10A shows the relationship between the optical axis of the projection lens and the detection axis of the acceleration sensor when the projector is horizontally installed in the vertically not-reversed state.

FIG. 10B shows the acceleration sensor output Vout_n0 in the above condition. In the illustrated example, the detection axis of the acceleration sensor is inclined by $\theta G_0$ relative to the optical axis of the projection lens.

The acceleration sensor output Vout_n0 is adjusted to be equal to an output that is obtained when the projector is in an actual horizontal state, taking into account a variation in the "Og offset" output of the acceleration sensor and an error output caused by the mounting error.

FIG. 10C shows the relationship between the optical axis of the projection lens and the detection axis of the acceleration sensor when the projector is horizontally installed in the vertically reversed state after the above-described adjustment.

FIG. 10D shows the acceleration sensor output Vout_r0 in the above condition. Because the projector is horizontally installed in both the vertically not-reversed state and the vertically reversed state, Vout_n0=Vout_r0 should be resulted if the optical axis of the projection lens and the detection axis of the acceleration sensor are parallel to each other (i.e., $\theta G_0=0$). In fact, however, an error of:

$$\Delta Vg = \sin(2 \times \theta G_0) \quad (1)$$

occurs as shown in FIG. 10D. That error is increased as the relationship between the optical axis of the projection lens and the detection axis of the acceleration sensor is deviated from parallelism in a larger amount.

SUMMARY OF THE INVENTION

The present invention provides a projection display apparatus which can accurately perform trapezoid correction regardless of the installed state of the projection display apparatus.

The projection display apparatus according to the present invention includes a display unit adapted to generate an image, a projection unit adapted to project the image generated by the display unit, a control unit adapted to control the image generated by the display unit, a detection unit adapted to issue an output changed depending on an inclination angle of the projection display apparatus, and a storage unit adapted to store a plurality of horizontal reference values corresponding to installed states of the projection display apparatus. The control unit is arranged to change the image generated by the display unit in accordance with an output of the detection unit and the selected horizontal reference value.

Further features of the present invention will become apparent from the following description of exemplary embodiments with reference to the attached drawings.

BRIEF DESCRIPTION OF THE DRAWINGS

FIG. 1 is a block diagram of a projector according to a first embodiment.

DESCRIPTION OF THE EMBODIMENTS

Figure 2A:
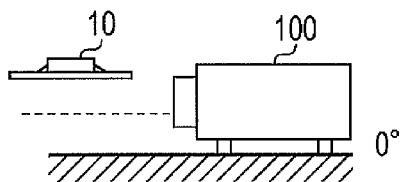
FIGS. 2A-2C illustrate respective installed states of the projector corresponding to adjustment steps.

Projection display apparatuses according to embodiments of the present invention will be described in detail below with reference to the accompanying drawings.

First Exemplary Embodiment

FIG. 1 is a block diagram of a projector (projection display apparatus) according to a first embodiment.

A video (image) input circuit 1 performs AD conversion of an analog video input signal 21 and outputs a digital image signal in a predetermined format. The output digital image signal is input to a digital signal processing circuit 2 and is subjected to a resolution conversion process, a frame rate conversion process, and a trapezoid correction process depending on a correction value "Keystone".

An output signal of the digital signal processing circuit 2 is input to a display drive circuit 3. The display drive circuit 3 generates a drive signal for a display panel (liquid crystal display panel) 4, i.e., a display unit, and it outputs the drive signal to the display panel 4. The display panel 4 generates an image in accordance with the signal from the display drive circuit 3.

Also, the display drive circuit 3 has the function of generating a control signal to control the write sequence of the image signal into the display panel 4, and of generating timing pulses. The display drive circuit 3 is able to switch over normal display and reversed display in accordance with a control signal "UD" from a controller 8.

The controller 8 comprises a microcomputer, etc., and executes normal/reversed display control in accordance with the control signal "UD", control for the trapezoid correction process depending on the correction value "Keystone", etc. in the digital signal processing circuit 2 and the display drive circuit 3. The digital signal processing circuit 2, the display drive circuit 3, and the controller 8 constitute a control unit for controlling the image generated by the display panel 4.

A projection lens 5 serving as a projection unit has the function of focusing the image generated by the display panel 4 on a screen. Also, the projection lens 5 has the zoom function, and a zoom encoder 9 for detecting a zooming position is associated with the projection lens 5.

An acceleration sensor (detection unit) 10 issues an output that is changed depending on an inclination angle of the projector. Memories 11 and 12 store respectively a horizontal reference value 1 and a horizontal reference value 2, which serves as horizontal reference data when the acceleration sensor 10 is installed in a vertically not-reversed state and a vertically reversed state. A selector 13 selects one of the horizontal reference data 1 and 2.

An angle calculation unit 14 calculates an angle from both the horizontal reference value selected by the selector 13 and the detected value from the acceleration sensor 10.

An operation switch 15 is operated by a user to switch over display in the case of floor standing installation (corresponding to the vertically not-reversed state) and display in the case of hanging installation from the ceiling (corresponding to the vertically reversed state). The operation switch 15 is, for example, a control button provided on a projector body, or a remote controller.

Generally, the controller 8, the angle calculation unit 14, and the selector 13 are constituted by, e.g., an MPU, and memories 11 and 12 storing the horizontal reference data 1 and 2 are constituted by, e.g., nonvolatile memories.

A method of calculating the angle from the detected value of the acceleration sensor 10 and the horizontal reference values 1, 2 and a practical flow of the trapezoid correction process using that method will be described later.

A method of obtaining the horizontal reference value 1 and the horizontal reference value 2, i.e., an adjustment method, is now described.

FIG. 2 shows an outline of the adjustment process flow. First, the adjustment is started in S201. In S202, as shown in FIG. 2A, the projector is installed in the vertically not-reversed state with the optical axis of the projection lens set in the horizontal state. A value corresponding to the output of the acceleration sensor at that time is set as the horizontal reference value 1:

horizontal reference value 1=Vout_n0

Figure 2B:
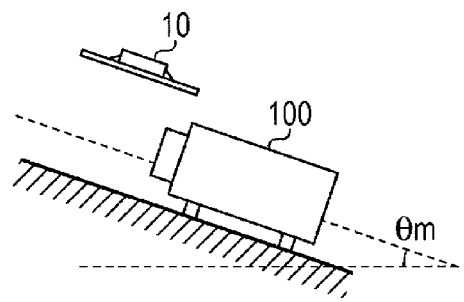

In S203, as shown in FIG. 2B, the optical axis of the projector is set to an allowable maximum installation angle $\theta m$ relative to the horizontal. In S204, the acceleration sensor output (Vout_m) in the maximally inclined state is held, and the sensitivity is calculated based on the following formula:

sensitivity=(Vout_m−Vout_n0)/sin $\theta m$

Figure 2C:
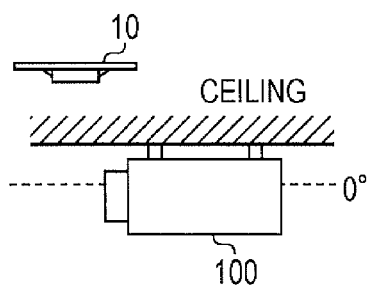

In S205, as shown in FIG. 2C, the projector is installed in the vertically reversed state with the optical axis of the projection lens set in the horizontal state. In S206, the output (Vout_r0) of the acceleration sensor in the vertically reversed state is set as the horizontal reference value 2:

horizontal reference value 2=Vout_r0

In S207, the above-mentioned "horizontal reference value 1" and "horizontal reference value 2" are stored in the memories 11 and 12, respectively. The "sensitivity" is stored in a memory (not shown) within the controller 8. In S208, the adjustment is brought to an end.

Figure 3A:
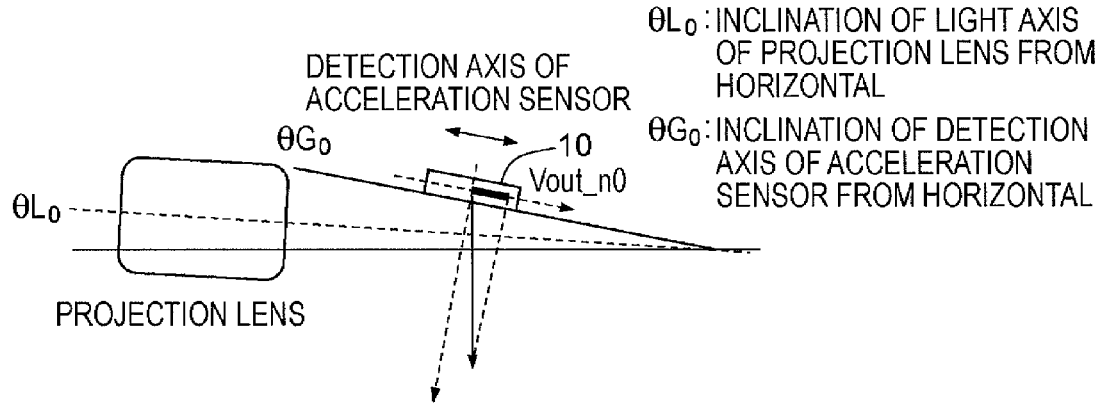
FIGS. 3A and 3B illustrate the installed states of the projector corresponding to FIGS. 2A and 2C.
Figure 3B:
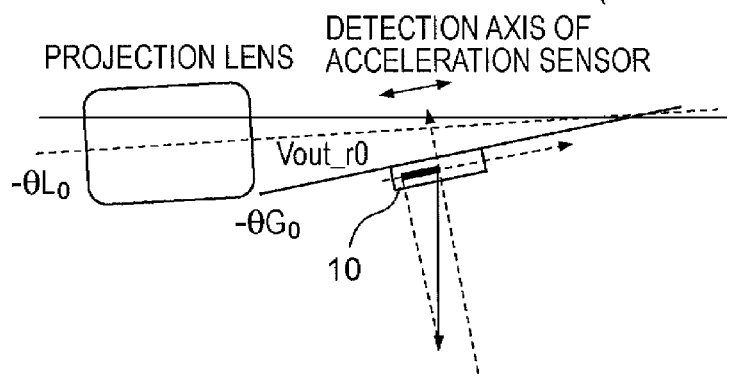
Figure 3C:
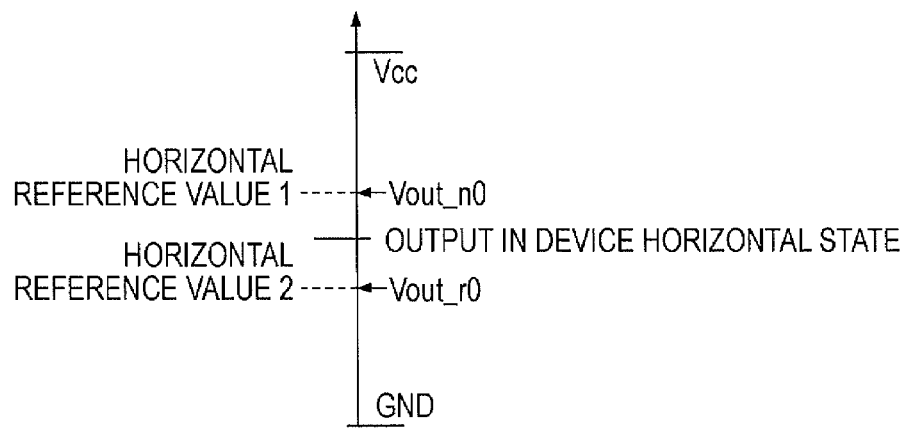
FIG. 3C illustrates outputs of an acceleration sensor in the first embodiment.

FIGS. 3A and 3B illustrate the states, shown in FIGS. 2A and 2C, in more detail, respectively. FIG. 3C illustrates output signals from the acceleration sensor 10 in the states shown in FIGS. 3A and 3B.

Herein, an inclination of the detection axis of the acceleration sensor relative to the horizontal is assumed to be $\theta G_0$, and an inclination of the optical axis of the projection lens is assumed to be $\theta L_0$. In this case, horizontal reference value 2−horizontal reference value 1=sin(2×($\theta G_0 - \theta L_0$))

Figure 2D:
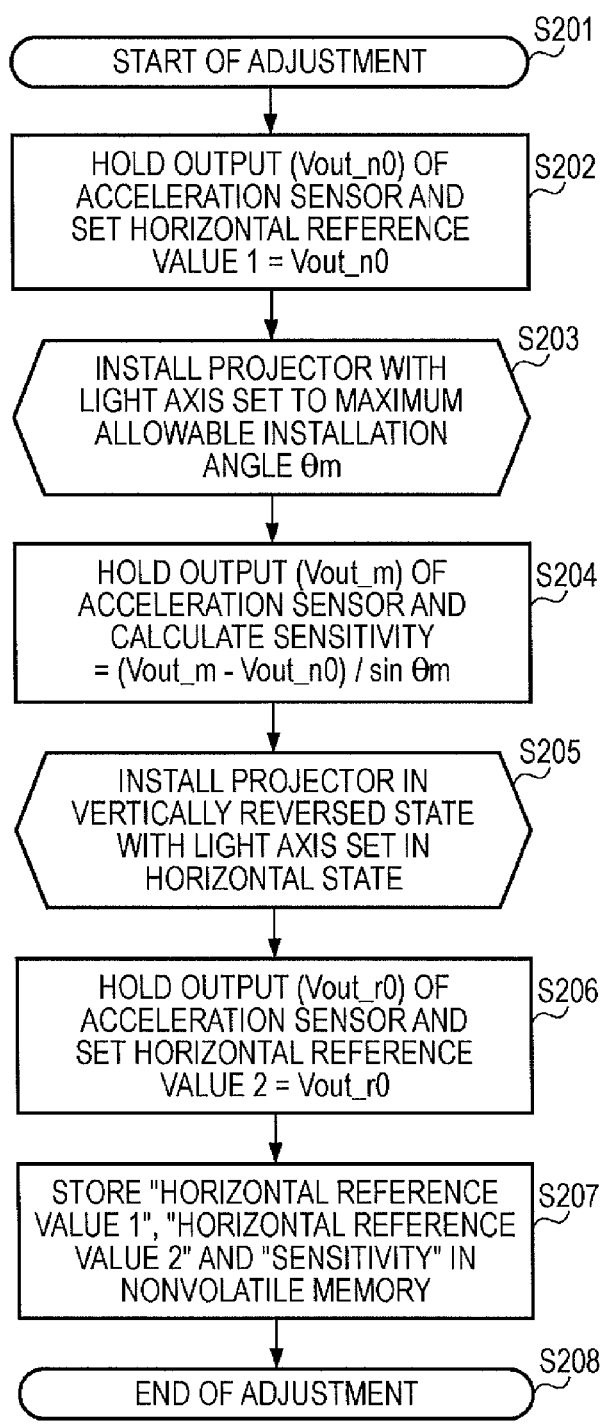
FIG. 2D is a flowchart showing the adjustment steps executed in the first embodiment.

In S202 and S205 of FIG. 2D, the projector body may be installed in the horizontal state instead of setting the optical axis of the projection lens 5 in the horizontal state. In such a case, however, there remains a minute error (corresponding to $\theta L_0$) resulting from deviation of the optical axis of the projection lens from the horizontal when the projector body is installed in the horizontal state.

The flow of the automatic trapezoid correction process executed in the thus-constructed system will be described below.

Figure 4:
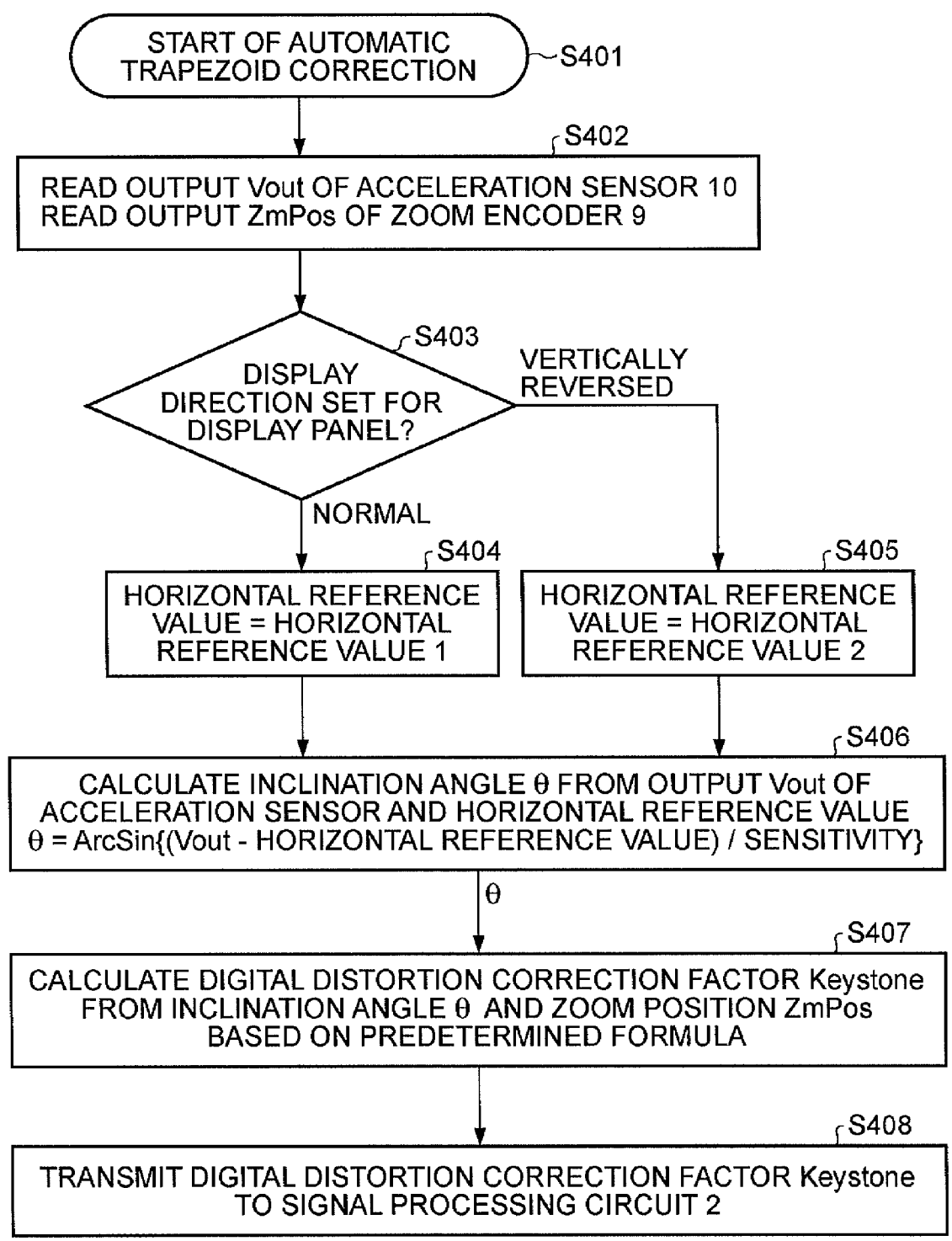
FIG. 4 is a flowchart showing a processing flow executed in the first embodiment.

FIG. 4 is a flowchart showing the automatic trapezoid correction process. In S401, the automatic trapezoid correction process is started. In S402, the MPU including the controller 8, the angle calculation unit 14, the selector 13, etc. reads the output (=Vout) of the acceleration sensor 10. Simultaneously, the MPU also reads the output (=ZmPos) of the zoom encoder 9 at that time.

In S403, the controller 8 as a part of the MPU obtains, in accordance with an instruction from the operation switch 15, information indicating whether an image is displayed in a normal state or in a vertically reversed state. Based on the obtained information, the controller 8 determines the display direction (i.e., normal display or vertically reversed display of the image) set for the display panel 4.

When the projector is installed in the floor standing state (ordinary installation), the normal display is selected, and when it is installed in the hanging state from the ceiling, the vertically reversed display is displayed.

In S404, in the case of the normal display, the horizontal reference value=the horizontal reference value 1 is set by the selector 13 as a part of the MPU. In S405, in the case of the vertically reversed display, the horizontal reference value=the horizontal reference value 2 is set by the selector 13.

In S406, the angle calculation unit 14 as a part of the MPU calculates the inclination angle $\theta$ based on the output Vout of the acceleration sensor and the horizontal reference value selected by the selector 13 from the following formula:

$\theta = \sin^{-1}\{(Vout - \text{horizontal reference value})/\text{sensitivity}\}$ In S407, the controller 8 as a part of the MPU calculates a digital distortion correction factor Keystone based on the inclination angle $\theta$ and the zooming position ZmPos by using a predetermined formula given below:

Keystone=$f(\theta, ZmPos)$

Herein, f(x,y) represents the function including the inclination angle and the zooming position as arguments and is decided depending on optical characteristics of the projection lens, etc.

Keystone represents a rate at which the digital signal processing circuit 2 executes geometrical correction (trapezoid correction) in a digital manner.

In S408, the controller 8 transmits the digital distortion correction factor Keystone to the digital signal processing circuit 2, and the digital signal processing circuit 2 executes the trapezoid correction in a digital manner on the image generated by the display panel 4.

Second Exemplary Embodiment

Figure 5:
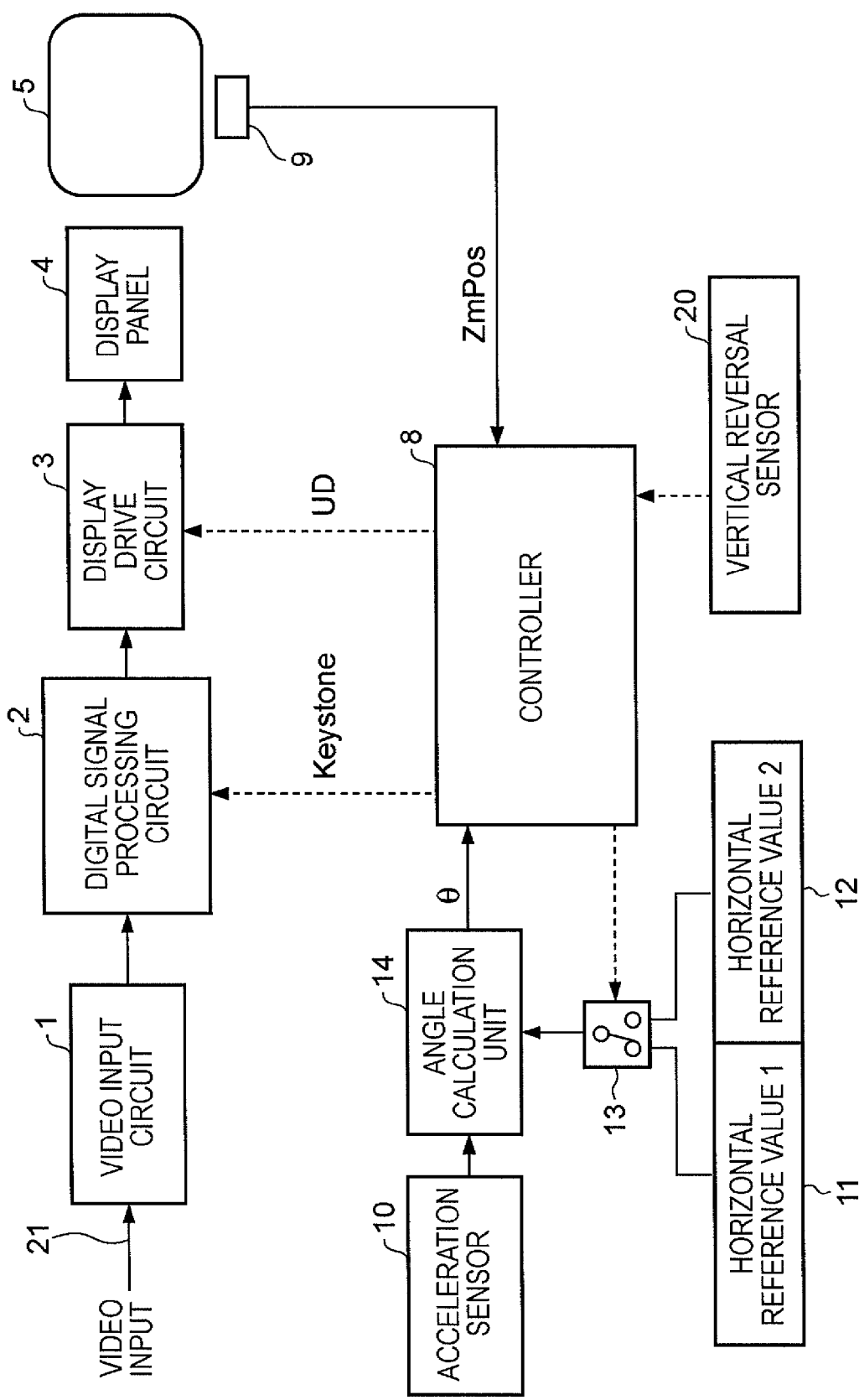
FIG. 5 is a block diagram of a projector according to a second embodiment.

FIG. 5 is a block diagram of a projector according to a second embodiment. The second embodiment differs from the first embodiment in that a vertical reversal sensor 20 for automatically detecting the installation of the projector in the vertically reversed state is disposed instead of the vertically reversing operation switch 15. The other components are the same as those in the first embodiment and a description thereof is not repeated here.

The vertical reversal sensor 20 can be constituted as a mechanical switch for detecting the installation of the projector in the vertically reversed state, or an acceleration sensor.

When the vertical reversal sensor 20 is constituted as an acceleration sensor, the acceleration sensor 10 can also be used as such an acceleration sensor if the former is prepared as an acceleration sensor having two or more detection axes. A method of obtaining the horizontal reference value 1 and the horizontal reference value 2 and performing an adjustment is the same as that described above in the first embodiment.

The flow of the automatic trapezoid correction process executed in the thus-constructed system will be described below.

Figure 6:
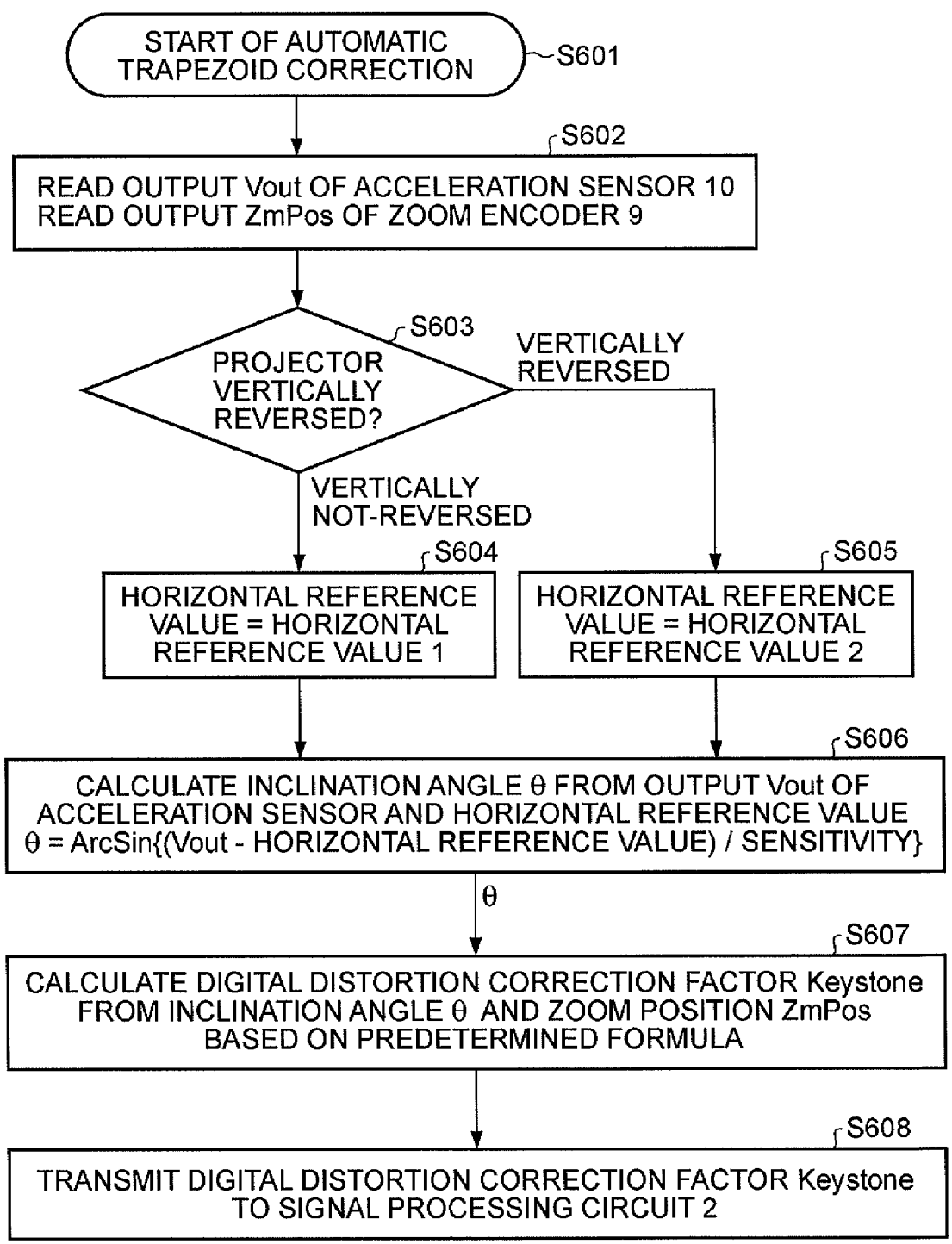
FIG. 6 is a flowchart showing adjustment steps executed in the second embodiment.
Figure 7A:
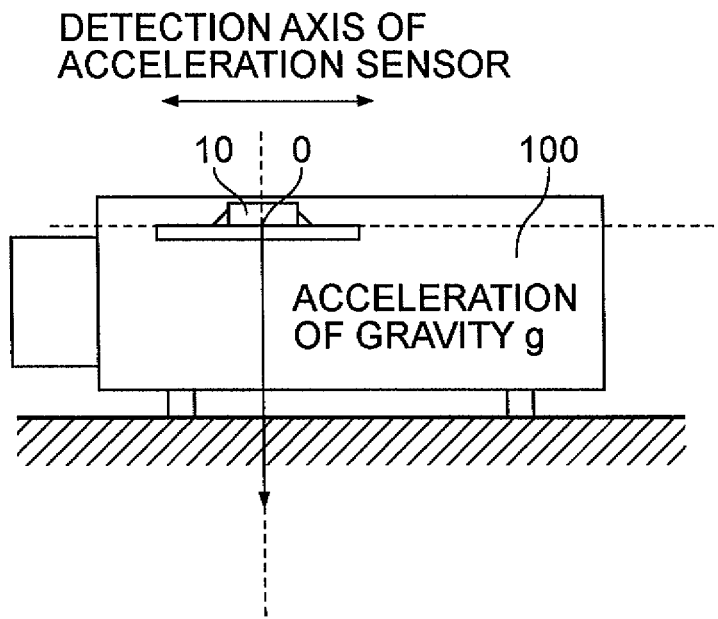
FIGS. 7A and 7B illustrate the relationship between an acceleration sensor and an inclination angle.
Figure 7B:
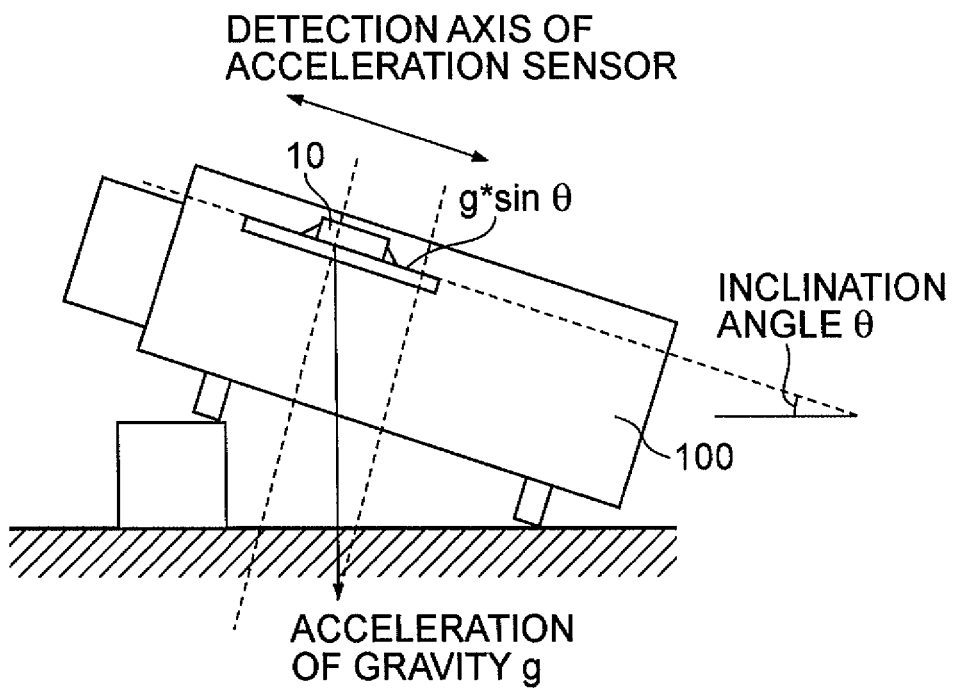
Figure 8:
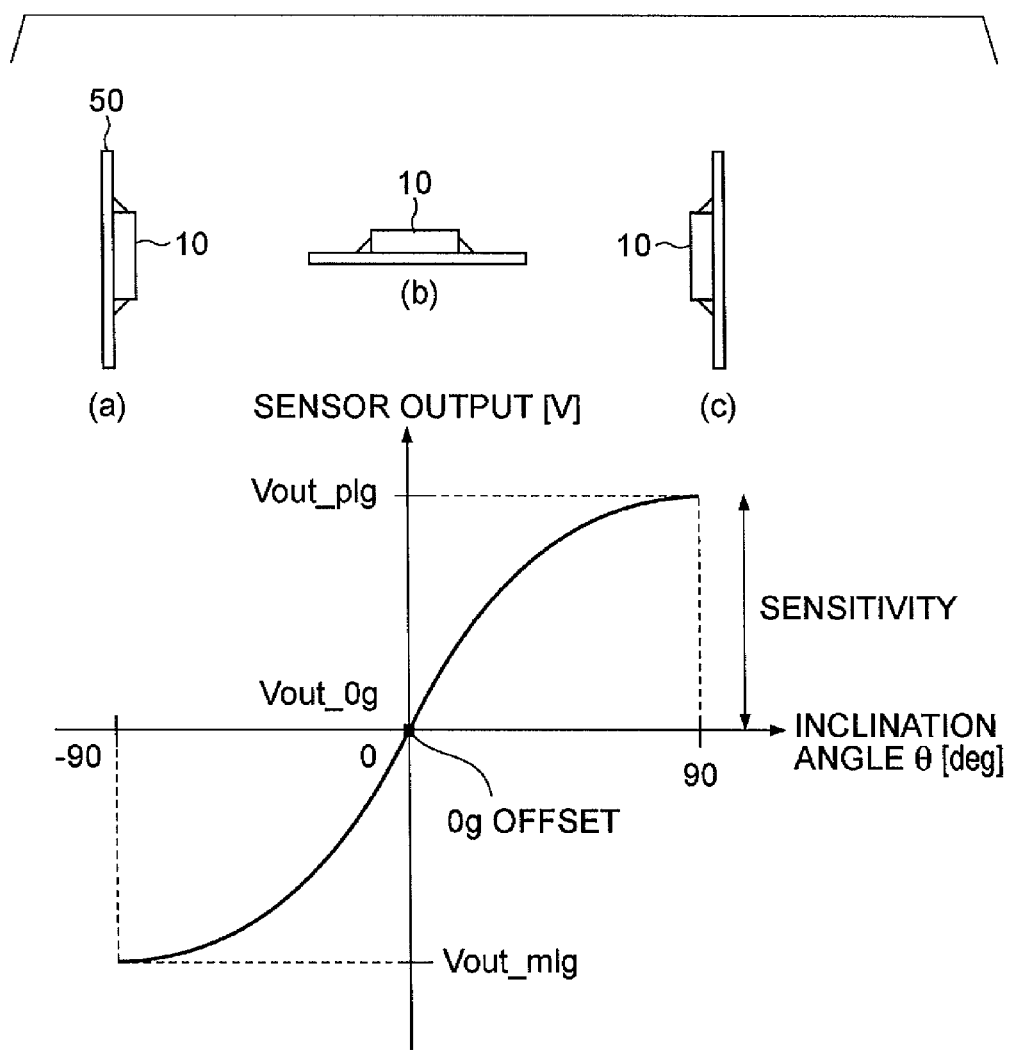
FIG. 8 illustrates output examples of the acceleration sensor.
Figure 9A:
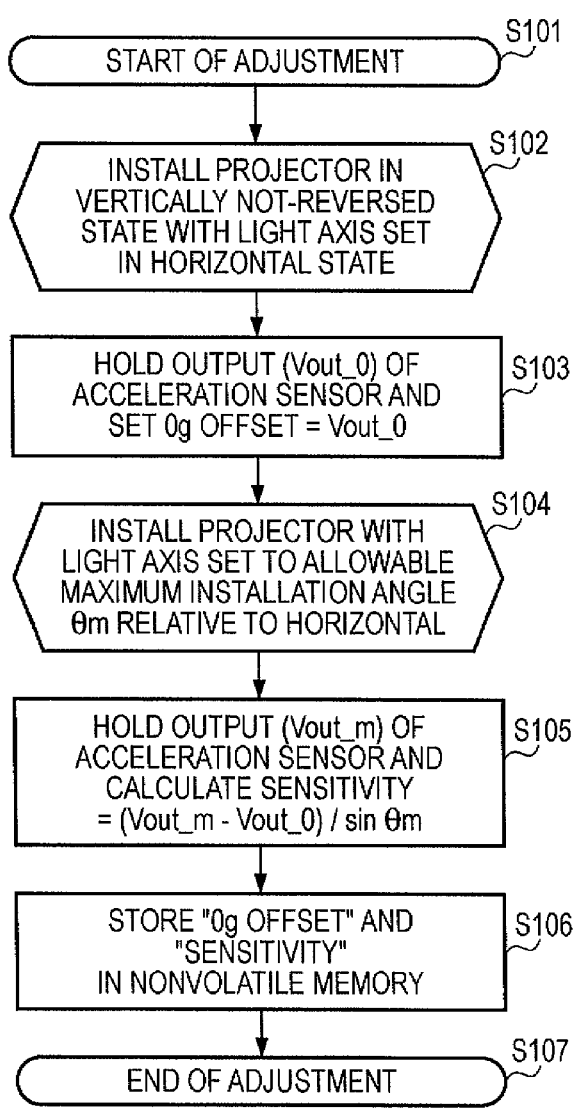
FIG. 9A is a flowchart showing a known adjustment method.
Figure 9B:
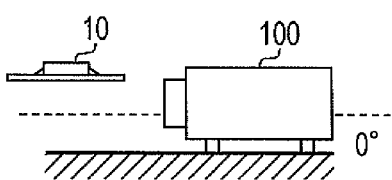
FIGS. 9B and 9C illustrate installed states of the acceleration sensor.
Figure 9C:
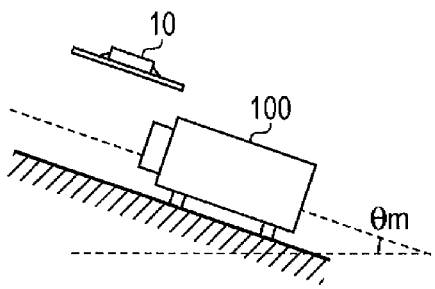
Figure 10A:
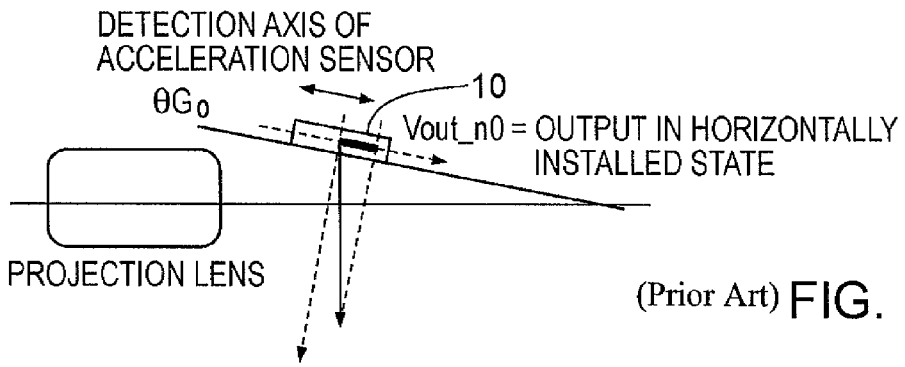
FIGS. 10A-10D are illustrations for explaining an error of a detected angle caused when the acceleration sensor is installed in a vertically reversed state.
Figure 10B:
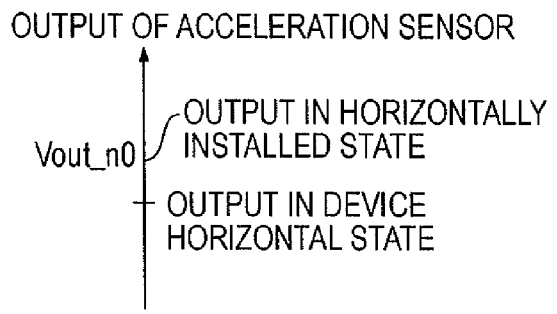
Figure 10C:
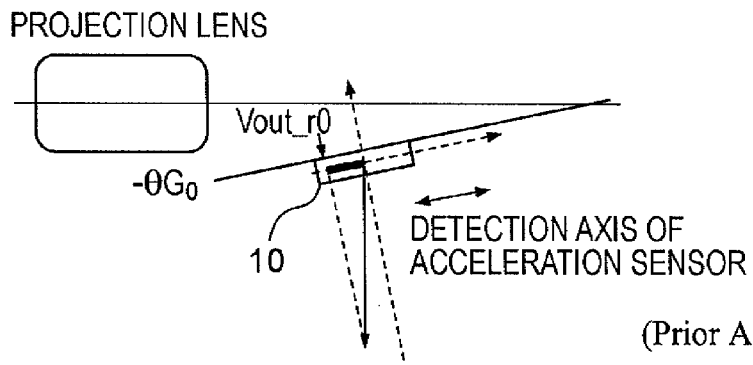
Figure 10D:
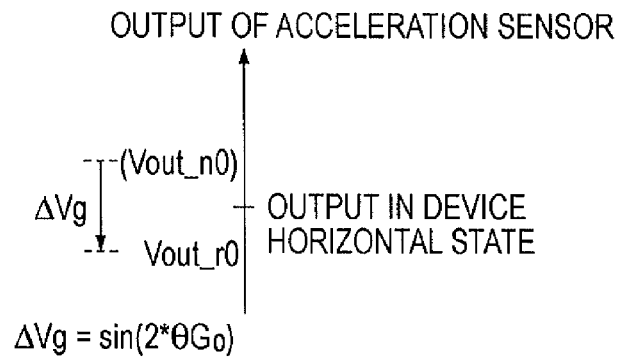

FIG. 6 is a flowchart showing the automatic trapezoid correction process. In S601, the automatic trapezoid correction process is started. In S602, the MPU reads the output (=Vout) of the acceleration sensor 10. Simultaneously, the MPU also reads the output (=ZmPos) of the zoom encoder 9 at that time.

In S603, the controller 8 as a part of the MPU obtains, from the vertical reversal sensor 20, information indicating whether the projector is installed in the vertically reversed state or not. Based on the obtained information, the controller 8 determines the installed state of the projector. Stated another way, the controller 8 and the vertical reversal sensor 20 operate as a determination unit for determining the installed state of the projector.

When the information indicating the vertically reversed installation is obtained from the acceleration sensor 10, whether the projector is installed in the vertically reversed state or not is determined from an output of the acceleration sensor 10 with respect to an axis other than the axis used to detect the inclination angle.

Subsequent steps are the same as those in the flowchart of FIG. 4 and a description thereof is omitted here.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed:

1. A projection display apparatus including:
a display unit that generates an image;
a projection unit that projects the image, via a projection lens;
a control unit configured to control the image;
a storage unit that stores a first horizontal reference value corresponding to an installed state of the projection display apparatus which is in a vertically not-reversed state, and a second horizontal reference value corresponding to an installed state of the projection apparatus which is in a vertically reversed state;
a vertical reversal determination unit that determines the installed state of the projection display apparatus;
a detection unit that issues an output (Vout) depending on an inclination angle $\theta$ of an optical axis of the projection lens; and
an angle calculation unit that calculates the inclination angle $\theta$ based upon output (Vout) and a selected horizontal reference value selected from either the first or second horizontal references value,
wherein the selected horizontal reference value is determined by the control unit based upon input from the vertical reversal determination unit,
wherein the control unit is configured to execute a trapezoid correction on the image generated by the display unit, by using the inclination angle of the projection display apparatus calculated by the angle calculation unit,
wherein the first horizontal reference value subtracted from the second horizontal reference value equals sin $[2\times(\theta G_0 - \theta L_0)]$, where $\theta G_0$ is an inclination angle of a detection axis of the detection unit relative to the horizontal state, and $\theta L_0$ is an inclination angle of the optical axis of the projection lens relative to the horizontal state.

2. The projection display apparatus according to claim 1, wherein the inclination angle $\theta$ is calculated based on the output Vout and the selected horizontal reference value from the following formulas:

$\theta = \sin^{-1}\{(Vout - \text{selected horizontal reference value})/\text{sensitivity}\}$ $\text{sensitivity} = (Vout\_m - Vout\_n0)/\sin\theta m$ wherein Vout_n0 is a value corresponding to an output of the detection unit when the projector display apparatus is installed in the vertically not-reversed state with the optical axis in the horizontal state, Vout_m is a value corresponding to an output of the detection unit when the projector display apparatus is installed in the vertically not-reversed state with the optical axis set to an allowable maximum installation angle $\theta m$ relative to the horizontal state.

3. The projection display apparatus according to claim 1, wherein the first horizontal reference value is a value corresponding to an output of the detection unit when the projector display apparatus is installed in the vertically not-reversed state with the optical axis in the horizontal state, and the second horizontal reference value is a value corresponding to an output of the detection unit when the projector display apparatus is installed in the vertically reversed state with the optical axis in the horizontal state.

4. The projection display apparatus according to claim 1, wherein the vertical reversal determination unit comprises a switch configured to determine an orientation of top and bottom sides of the image based on an orientation of the projection display apparatus, wherein the first or second horizontal reference value is determined in accordance with an instruction from the switch.

5. The projection display apparatus according to claim 1, wherein the vertical reversal determination unit comprises a sensor that detects the installed state of the projection display apparatus, wherein the first or second horizontal reference value is determined in accordance with an input from the sensor.

* * * * *